United States Patent [19]

Simmons et al.

[11] 4,292,513

[45] Sep. 29, 1981

[54] HEAT DETECTOR CIRCUIT

[75] Inventors: Richard R. Simmons, Twickenham; Harvey A. Thompson, Weybridge, both of England

[73] Assignee: Chubb Fire Security Limited, Sunbury on Thames, England

[21] Appl. No.: 80,716

[22] Filed: Oct. 1, 1979

[30] Foreign Application Priority Data

Sep. 29, 1978 [GB] United Kingdom ............... 38757/78

[51] Int. Cl.[3] ............................................ G01N 21/28

[52] U.S. Cl. ............................ 250/205; 250/214 AG; 250/573

[58] Field of Search ................. 250/205, 214 AG, 573

[56] References Cited

U.S. PATENT DOCUMENTS 4,206,456 6/1980 Malinowski et al. ............... 250/205

*Primary Examiner*—David C. Nelms

*Assistant Examiner*—Darwin R. Hostetter

*Attorney, Agent, or Firm*—Sughrue, Mion, Zinn, Macpeak and Seas

[57] ABSTRACT

A heat detector having automatic gain control in relation to changes of time constant different from that of the changes to be detected, comprises an outer feedback loop including the light path between emitter (10) and detector (14), and an inner feedback loop (40,42,44) around the emitter drive circuit. The inner feedback loop contains an exponential element (42). The exponential response of the inner loop feedback circuit makes the open-loop gain and the time constant of the system invariable in spite of differences in the light path, for example in different installations.

11 Claims, 2 Drawing Figures

HEAT DETECTOR CIRCUIT

Figure 1:
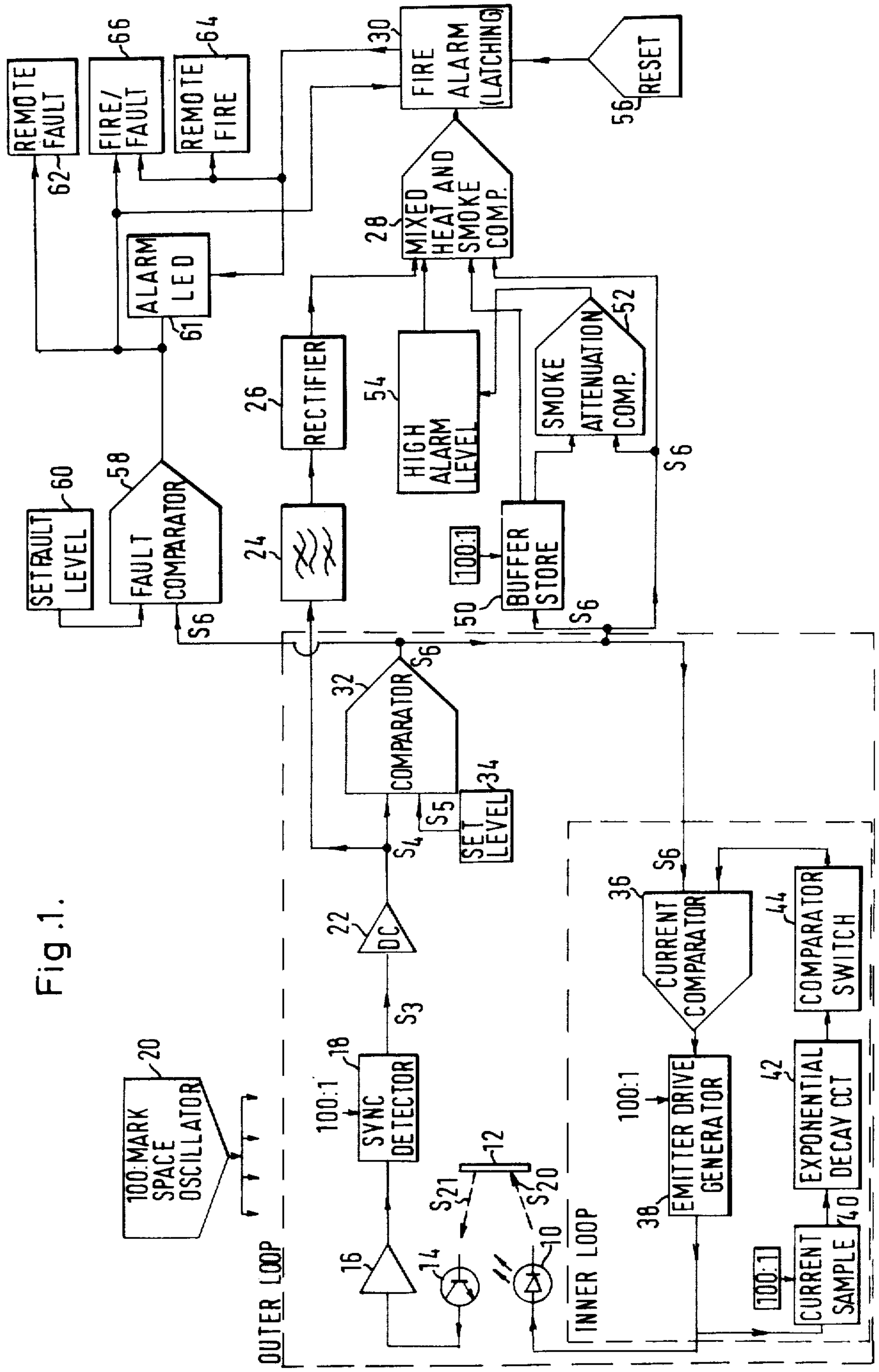

This invention relates to a heat detector, or a combined heat and smoke detector and is particularly concerned with improving the stability of such detectors of the kind in which a light-sensitive detector is arranged to recieve light from an emitter and to generate at its output an electric signal which undergoes a significant variation in the presence of heat or heat and smoke, the output of the detector circuit being used to provide an alarm indication in response to such variations.

In this specification, the term "light" is intended to include radiation at a frequency adjacent to that of the visible spectrum, for example infra-red radiation.

It is known to provide in smoke detectors, to improve their stability, a feedback circuit incorporating a delay between the output of the light-sensitive element and the electrical supply for the light-sensitive element or for the light emitter or both; the feedback circuit acts to adjust the voltage provided by the supply circuit so that the output of the detector is at least partly compensated for variations occurring over a period the minimum value of which is determined by the delay circuit. Such an arrangement is described in our British Pat. No. 1,313,877.

However, while this works well once the installation has been made, the problems of setting the apparatus up in installations of widely different characteristics still remain. These problems arise from the wide range of variation in the optical coupling due, for example, to the different sizes of the rooms in which the installation has to be set up. In conventional AGC systems, the open-loop gain is constant. In a heat detector system, the loop includes the optical coupling and therefore the open loop gain is highly variable, for example, over a 30:1 range. The response time and the stability of the closed loop depend on the open-loop gain. The response time is fairly closely defined in that the AGC system is required to respond to a relatively slow change in optical coupling (for example one to ten seconds). On the other hand, it must not respond to a rapid fluctuation (for example 3 Hz to 20 Hz) as otherwise it would cancel out the "thermal turbulence" effect by which a dangerous level of heat is detected; consequently the time constant is required to be greater than about 0.2 seconds. Because the response time depends on the open-loop gain, these restrictions appear to impose limits on the AGC range available.

According to the present invention a heat (or heat and smoke) detector having an automatic gain control system comprises a light emitter, a light detector for receiving light from the emitter, and an alarm circuit responsive to variations in the output of the detector due to variations in the optical coupling between the emitter and detector, and further comprises an emitter control circuit which is responsive to a variation in the amplitude of the signal derived from the light detector from a preset amplitude and which is such that the said variation results in an exponential increase in the driving signal for the light emitter. Thus, rather than a linear feedback element to achieve gain control, the present invention uses an exponential element which causes the emitter output to increase exponentially with "error signal"; "error signal" being the amplified difference between the output derived from the light detector and a preset or "target" amplitude. The function of the loop is to maintain the output signal at the target amplitude, in a period defined by the time constant of the loop.

The exponential element referred to is preferably provided in a further or inner loop which is described below. Briefly, the exponential response of the inner loop feedback circuit for varying the emitter driving signal results in a small-signal gain A for the emitter drive system which varies directly with the emitted power W. Because the emitted power W varies inversely with the feedback factor $\beta$ in an automatic gain control system, the product of A and $\beta$ (the open-loop gain) becomes invariable and therefore the time-constant of the system is also invariable in spite of changes in $\beta$.

In the preferred form of detector embodying the invention, an emitter diode of the kind providing an infra-red beam of radiation is used, and a retroreflector is used to return the beam along substantially the same path to a detector, which may be a phototransistor. Over large distances, where optical coupling is poor, a high emitter output is required. At shorter distances, the feedback system in a detector embodying the invention conserves power by reducing the emitter output and, more importantly, avoids overloading the detector amplifier.

Preferably, the feedback loop includes means for obtaining an error signal and a circuit responsive to the error signal to control the emitter drive current; the latter circuit includes an emitter drive current comparator responsive to the error signal and an emitter drive generator, and has a further feedback loop from the output of the emitter drive generator to the emitter drive current comparator input, the further feedback loop including an exponential decay circuit. The exponential decay circuit may comprise a capacitor which is charged in proportion to the amplitude of the emitter drive voltage, the stored voltage on the capacitor decaying exponentially. A sampling circuit samples the voltage proportional to the emitter drive current periodically to charge the capacitor. In the preferred circuit, a comparator is arranged to switch at a predetermined value of the voltage on the capacitor, the resulting comparator output pulses being integrated to give a voltage that is proportional to the logarithm of the sampled voltage and therefore to the logarithm of the emitter drive current. The comparator output is compared with the error voltage at the emitter drive current comparator.

The timing of the operation of the sampling circuit is synchronised with the timing of emitter drive current pulses to the emitter diode and with the operation of a synchronous detector following the phototransistor.

Figure 2:
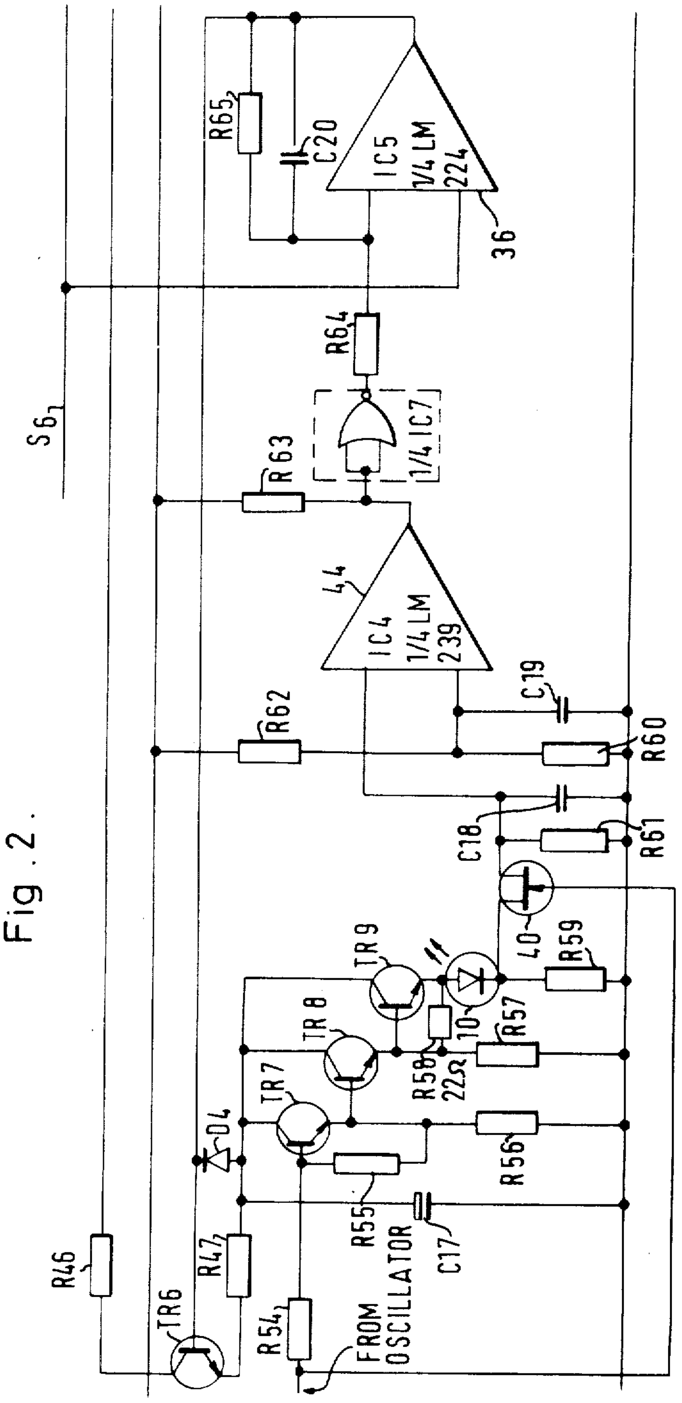

In order that the invention may be better understood, one example of a circuit embodying the invention will now be described with reference to the accompanying drawings, in which:

FIG. 1 is a block circuit diagram of a heat and smoke detector embodying the invention; and FIG. 2 is a circuit diagram of the portion of the inner loop feedback circuit in the detector of FIG. 1.

In FIG. 1 of the drawings, an emitter diode 10 transmits light (infra-red radiation) to a reflector 12 which reflects this radiation to a photo-transistor 14. The phototransistor output is a signal S1 which is applied through a pre-amplifier to a synchronous detector, controlled from an oscillator 20 with a mark-space ratio of 1:100. The same oscillator controls the timing of emitter drive current pulses S8 from the emitter drive generator 22 to the emitter diode 10.

The output (S3) of the synchronous detector 18 is applied through a DC amplifier 22 and the resulting signal (S4) with superposed modulation due to the effect of thermal turbulence, is applied through a band-pass amplifier 24 and a rectifier 26 to a "heat and smoke" comparator 28, and thence to a fire alarm 30.

The signal S4 is also applied to a comparator 32 in the outer AGC loop, the comparator also receiving a signal S5 from a "set level" circuit 34. The comparator output is an error voltage S6 which is conducted to an emitter drive current comparator 36 which feeds the emitter drive generator 38. The emitter drive current comparator 36 and the emitter drive generator 38 are in an inner loop with a feedback circuit which comprises an emitter drive current sampling circuit 40, receiving the signal S8 and providing sample pulses S9, an exponential decay circuit 42 receiving the sample pulses, and a comparator switch 44 which receives the output S10 of the exponential decay circuit 42, generates pulses of a length dependent on the amplitude of the sample pulses, and integrates the resulting signals to provide an output S11 proportional to the logarithm of the input voltage to the exponential decay circuit 42. This signal S11 is compared with the error voltage S6 at the emitter drive current comparator 36.

The error voltage is also used to control a smoke detector circuit and a fault indicator.

In further explanation of this circuit, it provides a loop which varies in effectiveness with the error signal and thereby enables the response time to be maintained within the desired limits in spite of variations in the effectiveness of the optical coupling. One effect of this is that a given increase in error voltage (for example a 2-volt increase) means that the emitter power is multiplied by a factor n whether this 2-volt increase is from 8 volts to 10 volts or from 3 volts to 5 volts, for example.

FIG. 2 shows the portion of the circuit responsible for generating the emitter drive current. The error signal S6 is applied to one input of the emitter drive current comparator 36, the output signal S7 from which goes to an emitter drive generator comprising the transistors TR6 to TR9. The base of transistor TR7 is pulsed by the 1:100 signal from the oscillator. The resulting drive current pulses are applied to the emitter diode 10 and a voltage proportional to these pulses is obtained across the resistor R59. This voltage is sampled by the drive current sampler 40 and the sampled pulses charge the capacitor C18 (4,700 pF). The stored voltage decays exponentially through resistor R61. A threshold voltage is set by resistors R60 and R62, so that the comparator 44 switches at a set voltage. The comparator output pulse is integrated to give the voltage proportional to the logarithm of the input voltage, and this is applied to the second input of the emitter drive current comparator 36 and is then compared with the error signal S6.

In further explanation of the operation of the apparatus, in a feedback system, the feedback signal Vf is given by $$Vf = Vc\,\beta Af(s)/1+\beta Af(s),$$

where Vc is the input or demand level, $\beta$ is the feedback ratio, and where the forward gain system has a forward gain of amplitude A and frequency dependence f(s). If the function f(s) is a first order low pass filter, it takes the form $$f(s)=1/1+st$$

By substituting this in the feedback equation one arrives at the well known result that when a filter with time constant t is inserted into a feedback loop whose open loop gain is $\beta$A, then the effective time constant is reduced by the factor $(1+\beta A)$.

Referring to the general block diagram of FIG. 1, the forward gain system is constituted by the emitter drive circuit 36, 38 controlled by the error voltage S6, with the "inner" feedback loop 40, 42, 44; an output is provided in the form of emitted light of power W. The main feedback system can be identified as the optical path between emitter and detector via the reflector, detector and the synchronous amplifier. The returning signal level S4 (Vf) is compared to a constant "command" level S5 (Vc), and any "error" S6 (Vc-Vf) is amplified to give a corrective change to the emitted light power.

In this case however the feedback path ratio $\beta$ is a variable, dependent on the separation between the fire detector and the reflector and other factors involving optical efficiency.

This variation in $\beta$ thus determines the closed loop time constant t'. In the equipment described above it is required that (i) the A.G.C. responds to a relatively slow (about 1 sec to about 10 sec) change in optical coupling; i.e., that $t' \leqq 1$ sec (ii) the A.G.C. does not respond to a rapid fluctuation (3 Hz to 20 Hz) in optical coupling as otherwise it would cancel out the "thermal turbulence" effect, i.e., that $t' \geqq 0.2$ sec.

A change in $\beta$ directly modulates the output power W to cause a variation in S4 (Vf). The AGC response to a change in Vf is equivalent to an opposite change in Vc. Hence a modulation of $\beta$ is subject to the variation in t'. It is necessary as seen above to maintian t' within fairly close limits, and this is done by using logarithmic feedback to maintain the open loop gain AB at a constant value.

In the logarithmic feedback system, the "forward gain" system 36, 38 of FIG. 2 accepts the "error voltage " input S6 (e) and gives an output emitted light power W that is proportional to the exponential of e.

$$W=K_1\exp K_2e$$

The small-signal gain A of this stage is then $$dW/de=K_1K_2\exp K_2e=K_2W$$

The power output W is inversely proportional to the feedback ratio $\beta$, as $$Vf=W\beta$$

so the forward small signal gain A is now a function of the attenuation of the signal on the return optical path, as shown below:

$$A=K_2W=K_2Vf/\beta$$

Thus the overall open loop gain A$\beta$ is $$K_2Vf$$

It will be seen that the variable element in the feedback ratio factor of the open loop gain has been compensated by the exponentially variable term in the forward small signal gain element. The overall open loop gain is a constant and so t' is a constant.

The apparatus shown in FIG. 1 responds to smoke as well as to thermal turbulence. The smoke alarm circuits receive the error signal S6 from the comparator 32. Of course, the AGC system tends to nullify this error signal but there must always be an error voltage remaining to permit the AGC system to operate. It is this remaining error voltage which varies with the optical coupling and therefore with smoke obscuration.

The signal S6 is applied both to a switched-mode buffer store 50 and to one input of a smoke attenuation comparator 52. The other input of the smoke attenuation comparator receives the output of the buffer store. It thus makes a comparison between the current value of the signal S6 and an earlier value of this signal. When obscuration by smoke has reduced the output of the comparator 32 to a level sufficiently less than that of the stored signal from the buffer store, the output of the comparator 52 reaches a value at which the alarm level circuit 54 is actuated. This circuit operates in response to a high level of smoke. The output of the circuit 54 is applied to the heat and smoke comparator 28.

The circuit 28 also receives the error signal S6 on its lowermost input and the signal from the buffer store on the remaining input. The buffer store signal serves for comparison with the other signals in the mixed heat and smoke comparator 28, which actuates a latching fire alarm 30 in response to a high level heat signal or a high level smoke signal or in response to the occurrence of lower levels of heat and smoke signals in combination. A circuit 56 is provided for resetting the fire alarm.

In addition to the heat and smoke detector circuits there is a fault detection circuit. The error signal S6 is also applied to a fault comparator 58 receiving a reference signal from a "set fault level" circuit 60. If the error signal S6 reaches an abnormal value, the output of the comparator 58 illuminates an alarm-indicating light emitting diode 60. The diode 60 is also illuminated by the operation of the fire alarm latching circuit 30.

The apparatus is also provided with a remote fault indicator 62, a remote fire indicator 64 and a fire or fault indicator 66.

We claim:

1. Heat detection apparatus comprising a light emitter, a light detector for receiving light from the emitter, and an alarm circuit responsive to variations in the output of the detector due to variations in the optical coupling between the emitter and detector, and further comprising an automatic gain control circuit having a time constant such that it does not react to the thermal turbulence to which the apparatus is designed to respond, the automatic gain control circuit including an emitter control circuit which is responsive to a variation in the amplitude of the signal derived from the light detector from a preset amplitude and which is such that the said variation results in an exponential increase in the driving signal for the light emitter.

2. Heat detection apparatus in accordance with claim 1, in which the emitter control circuit includes an outer feedback loop and an inner feedback loop, the outer feedback loop including the light path and providing a signal representing the said variation, and the inner feedback loop containing an exponential element, the exponential response of the inner loop feedback circuit varying the emitter driving signal so as to result in a small-signal gain for the emitter drive system which varies directly with the emitted power, whereby the open-loop gain and the time constant of the system are invariable in spite of changes in the feedback factor.

3. Heat detection apparatus in accordance with claim 2, in which the outer feedback loop includes means for obtaining the error signal representing the said variation and a circuit responsive to the error signal to control the emitter drive current, the said circuit including an emitter drive current comparator receiving the error signal and an emitter drive generator responsive to the comparator output, and in which the inner feedback loop extends from the output of the emitter drive generator to the emitter drive current comparator input and includes the element having an exponential response.

4. Heat detecting apparatus in accordance with claim 3, in which the exponential element comprises a capacitor which is charged in proportion to the amplitude of the emitter drive voltage, the stored voltage on the capacitor decaying exponentially.

5. Heat detecting apparatus in accordance with claim 4, comprising a sampling circuit which periodically charges the capacitor in accordance with a voltage proportional to the emitter drive current.

6. Heat detecting apparatus in accordance with claim 5, in which the inner feedback loop comprises a comparator arranged to switch at a predetermined value of the voltage on the capacitor, the resulting comparator output pulses being integrated to give a voltage that is proportional to the logarithm of the sampled voltage and therefore to the logarithm of the emitter drive current, the comparator output being compared with the error voltage at the emitter drive current comparator.

7. Heat detection apparatus in accordance with claim 1 in which the emitter is a diode of the kind providing an infra-red beam of radiation.

8. Heat detection apparatus in accordance with claim 1, in which the detector is a phototransistor.

9. Fire detection apparatus including heat detection apparatus in accordance with any one of claims 1 to 8, and further comprising a smoke responsive circuit for operating the alarm circuit when the signal from the light detector indicates an obscuration of a sufficient magnitude between the light emitter and the light detector.

10. Fire detection apparatus in accordance with claim 9, as appendant to claim 3, in which the smoke responsive circuit receives the said error signal.

11. Fire detection apparatus in accordance with claim 10, in which the smoke responsive circuit comprises a store receiving the error signal and a comparator which receives a delayed output from the store and also the instantaneous error signal and provides an output representative of their difference.

* * * * *